Patented May 12, 1925.

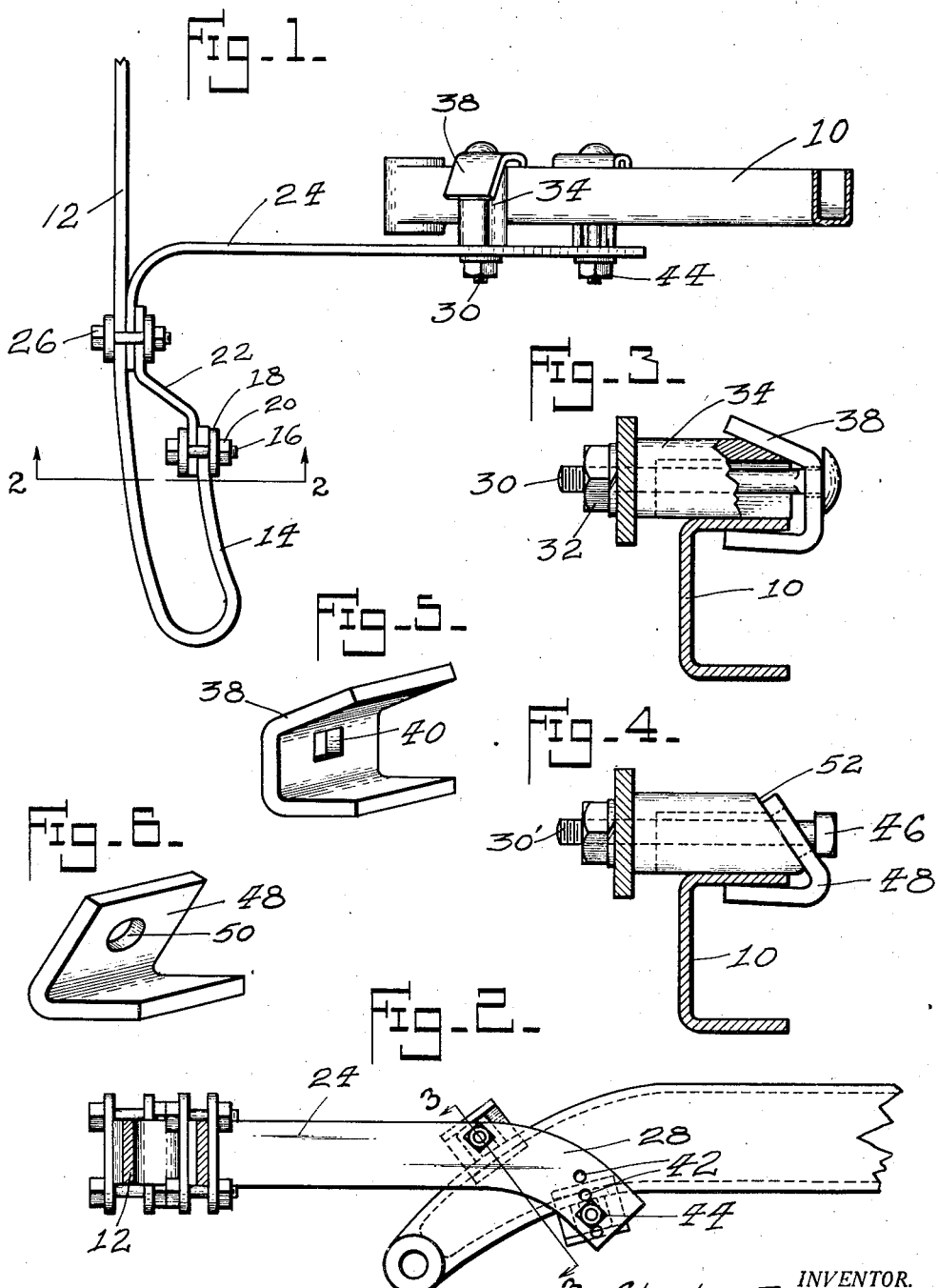

1,537,473

UNITED STATES PATENT OFFICE.

CHARLES E. KRAUS, OF LOUISVILLE, KENTUCKY, ASSIGNOR TO FRED W. KRAUS, OF LOUISVILLE, KENTUCKY.

AUTOMOBILE BUMPER AND ATTACHING MEANS.

Application filed April 25, 1924. Serial No. 708,854.

REISSUED

*To all whom it may concern:*

Be it known that I, CHARLES E. KRAUS, a citizen of the United States, residing at Louisville, in the county of Jefferson and State of Kentucky, have invented certain new and useful improvements in Automobile Bumpers and Attaching Means; and I do hereby declare the following to be a full, clear, and exact description of the invention, such as will enable others skilled in the art to which it appertains to make and use the same.

This invention relates to improvements in automobile bumpers and attaching means therefor, and has for one of its principal objects the provision of a bumper or similar protecting bar for either the front or rear of automobiles which will be simple of construction, economically manufactured, and very readily applied to the automobile, besides being neat and distinctive in appearance.

One of the principal objects of this invention is the provision, in an automobile bumper, of attaching elements whereby the same may be readily affixed to the chassis or frame members of an automobile without the necessity of drilling any holes in the automobile chassis, or of making any changes whatsoever in the construction and arrangement of the chassis, springs, and other parts thereof.

Still another important object of this invention is the provision of attaching and supporting elements for automobile bumpers or the like comprising clamp or wedge members which are so constructed as to be readily and conveniently applied to the channeled frame or chassis members of the automobile, and which, when applied, will be securely and positively maintained in desired position.

Other and further important objects of the invention will be apparent from the disclosures in the accompanying drawings and following specification.

The invention, in a preferred form, is illustrated in the drawings and hereinafter more fully described.

In the drawings:

Figure 1 is a top plan view of a portion of the improved automobile bumper of this invention illustrating the novel attaching means applied thereto and in conjunction with a portion of an automobile frame or chassis.

Figure 2 is a side view of the device as illustrated in Figure 1, portions being shown in section and taken along the line 2—2 of Figure 1.

Figure 3 is a sectional view taken on the line 3—3 of Figure 2, looking in the direction indicated by the arrows.

Figure 4 is a sectional view, somewhat similar to Figure 3, but illustrating a slight modification of the invention.

Figure 5 is a detail perspective view illustrating the attaching clamp as shown in Figure 3.

Figure 6 is a detail perspective view illustrating the modified attaching clamp shown in Figure 4.

As shown in the drawings:

The reference numeral 10 indicates generally a portion of the chassis or frame of an automobile of the usual channeled construction. A bumper comprising mainly a transversely extending bar 12 is adapted to be applied to the chassis or frame member 10, and, as best shown in Figure 1, the ends of the bar 12 are bent rearwardly and thence inwardly to form a rounded end, the inwardly extending portion as illustrated at 14 being substantially parallel to the main portion of the bar 12.

A suitable opening is provided in the end of the inwardly bent portion 14 and through this opening is passed a bolt 16 provided with suitable washers 18 and a retaining nut 20 which bolt also passes through a corresponding opening in a short member 22 formed in a zigzag shape as best illustrated in Figure 1, having its other end adapted to co-operate with a section of the main bar 12.

Fitted between the inner end of the zigzag member 22 and a co-operating portion of the main bar 12 is the end of an extending arm 24 which is adapted to support the bumper in position. Suitable retaining means in the form of a bolt 26 are provided at this point and the bolt passes through proper openings in the ends of the member 22, the supporting element 24 and in the main bar 12.

The rearward end of the supporting or extending member 24 is preferably bent downwardly as best illustrated at 28 in Figure 2, and is fitted with a number of openings. One of these openings is provided at a point closely approximating the beginning of the downwardly bent portion 28 and is adapted for the reception of a bolt or the like 30 as best illustrated in Figures 1 and 3, which bolt is fitted with a retaining nut 32 and a suitably shaped sleeve 34, the construction of which is best illustrated in the broken away portions in Figure 3.

Adapted to co-operate with this sleeve 34 and with the bolt 30 is a clamping element 38 bent as shown in Figures 3 and 5, the upper extension of which is adapted to co-operate with a correspondingly inclined wedge face of the sleeve member 34 and the lower extension of which is adapted to reach under and firmly clamp against the under face of the channeled member 10 forming part of the automobile chassis. A suitable squared opening 40 is provided in the clamping member adapted for the reception of the correspondingly squared shank portion of the bolt 30.

The downwardly extending portion 28 of the supporting element 24 is fitted with a series of openings as best illustrated at 42 in Figure 2 and through any one of these openings is adapted to pass a bolt 44 fitted with a sleeve 34 and a clamping element 38 as has already been described in conjunction with the bolt 30. It will be evident that the positioning of the bolt 44 in any one of the series of holes 42 will result in a corresponding raising or lowering of the bumper 12 whereby the height and relation of the bumper with respect to the automobile may be accurately adjusted as desired.

A slight modification of the clamping device is illustrated in Figures 4 and 6 wherein the bolt 30′ is formed with a squared head 46, the head itself being adapted to contact with the modified clamping member as illustrated at 48 and which comprises in this instance merely a V-shaped member as illustrated, having a circular opening 50 in one of the sides thereof. The bearing sleeve adapted to surround the bolt 30 is formed with a more angularly inclined end as illustrated at 52 for proper wedging contact with the inner face of the member 48. The lower end of this member fits under and grips the channeled frame member 10 in the manner illustrated in Figure 4.

It will be seen that herein is provided an automobile bumper of simple yet strong and durable construction, and which is composed of a minimum of parts, and therefore not likely to work loose, rattle, or get out of order.

Further, the attaching means particularly provide a simple method of positively affixing the bumper to the automobile chassis, and without the use of any special tools, and without the necessity of drilling holes or inserting fastening elements in the automobile frame.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. An automobile bumper, including in combination, a transversely extending bar, each end of said bar being bent rearwardly and thence inwardly in parallel relation to the main portion of said bar, bracing elements affixed to the end of each of said inward extensions, each of said bracing elements comprising a member having offset ends, one of said ends attached to said inwardly extending end and the other end adapted to co-operate with the main portion of the bumper bar, and means co-operating with the bracing elements for attaching the bumper to an automobile.

2. An automobile bumper, including in combination, a transversely extending bar, each end of said bar being bent rearwardly and thence inwardly in parallel relation to the main portion of said bar, a bracing element affixed to the free end of said inward extension, said bracing element comprising a member having offset ends, one of said ends attached to said inwardly extending end and the other end adapted to co-operate with the main portion of the bumper bar, and means for attaching the bumper to an automobile, said means comprising a support member affixed to the bumper at the junction of the aforesaid bracing means with the bumper.

3. In an automobile bumper, a support, means for attaching the same to a chassis, including angle shaped clamping members adapted to co-operate with the channel frame of said chassis, and means for mounting said angle shaped members on the bumper support, said means comprising shackle bolts passing through the support and said angle members, sleeves surrounding the shanks of said bolts, and inclined faces on the ends of said sleeves adapted to co-operate with the aforesaid angle shaped clamping members.

In testimony whereof I affix my signature.

CHARLES E. KRAUS.